United States Patent [19]

Satoh et al.

[11] Patent Number: 5,170,628
[45] Date of Patent: Dec. 15, 1992

[54] BRAKE BOOSTER

[75] Inventors: Tohru Satoh; Atushi Satoh, both of Saitama, Japan

[73] Assignee: Jidosha Kiki Co., Ltd., Tokyo, Japan

[21] Appl. No.: 763,808

[22] Filed: Sep. 23, 1991

[30] Foreign Application Priority Data

Oct. 12, 1990 [JP]  Japan .................................. 2-274620

[51] Int. Cl.$^5$ ............................................. B60T 13/00
[52] U.S. Cl. .................. 60/547.1; 91/369.1; 91/376 R; 92/48
[58] Field of Search ...................... 60/547.1; 91/369.1, 91/369.2, 369.3, 369.4, 376 R; 92/48

[56] References Cited

U.S. PATENT DOCUMENTS

| | | | |
|---|---|---|---|
| 4,608,826 | 9/1986 | Sawyer | 60/547.1 |
| 4,976,188 | 12/1990 | Suzuki et al. | |
| 5,046,399 | 9/1991 | Koshimizu | 91/369.3 |
| 5,062,348 | 11/1991 | Gotoh et al. | 91/369.2 |

FOREIGN PATENT DOCUMENTS 2-114056 4/1990 Japan .

Primary Examiner—Edward K. Look
Assistant Examiner—Todd Mattingly
Attorney, Agent, or Firm—Flynn, Thiel, Boutell & Tanis

[57] ABSTRACT

A brake booster such as of a tandem type having a center plate disposed within a shell is disclosed. A valve body has a stepped end face, from which a cylindrical portion extends rearwardly. The cylindrical portion extends through a rear power piston and a rear diaphragm while maintaining a hermetic seal therebetween, with a distal end of the cylindrical portion being disposed within a variable pressure chamber of a rear chamber. The internal space of the cylindrical portion defines the rear end of a variable pressure passage. This arrangement allows the rear end of the variable pressure passage (the cylindrical portion) to be disposed in radially overlapping relationship with the rear power piston, thereby allowing the external diameter of the valve body to be reduced. In this manner, the effective area of the front power piston connected to the valve body may be increased as compared with the prior art.

5 Claims, 2 Drawing Sheets

BRAKE BOOSTER

FIELD OF THE INVENTION

The invention relates to a brake booster of a type such as of a tandem type in which a center plate is disposed within a shell thereof.

DESCRIPTION OF THE PRIOR ART

A brake booster is known in the art comprising a center plate which divides the interior of a shell into a front and a rear chamber, a valve body slidably extending through the center plate, a front power piston connected to a portion of the valve body which is disposed within the front chamber, a rear power piston connected to another portion of the valves body which is disposed within the rear chamber, a front diaphragm applied to the back surface of the front power piston and dividing the interior of the front chamber into a constant and a variable pressure chamber, a rear diaphragm applied to the back surface of the rear power piston and dividing the interior of the rear chamber into a constant and a variable pressure chamber, a constant pressure passage formed in the valve body and providing a communication between the constant pressure chambers of the front and the rear chamber, and a variable pressure passage formed in the valve body and providing a communication between the variable pressure chambers of the front and the rear chamber, the rear power piston being formed with a cylindrical portion around its inner periphery which is fitted into an annular groove formed in a stepped end face of the valve body to thereby connect the rear power piston to the valve body, as disclosed, for example, in Japanese Laid-Open Patent Application No. 114,056/1990.

In a conventional brake booster of the type described above, the variable pressure passage must be formed in the valve body in a manner such that the front end of the passage communicates with the constant pressure chamber at a location rearward of the front power piston while the rear end of the passage communicates with the variable pressure chamber between the rear power piston and the rear shell.

However, in a conventional brake booster as mentioned above, a rear power piston includes a cylindrical portion which is fitted into an annular groove in the valve body, so that the rear end of the variable pressure passage must open into a stepped end face of the valve body which is located radially inward of the annular groove in the valve body. Accordingly, in the conventional brake booster, it is necessary that the radial dimension of the stepped end face of the valve body be increased, thus resulting in an increased radial dimension of the valve body. This accompanies a disadvantage that the effective area of the front power piston which is mounted on the valve body becomes reduced with an increase in the radial dimension of the valve body.

In particular, it is to be noted that a brake booster is proposed recently in which a master cylinder is fitted around an axial portion of the booster on its front side. In such an arrangement, the radial dimension of the front side of the valve body must also be increased, again resulting in a reduced effective area of the front power piston which is connected thereto.

Therefore, it is an object of the invention to provide an increased effective area of a front power piston by reducing the radial dimension of a valve body.

SUMMARY OF THE INVENTION

In view of the foregoing, the invention relates to a brake booster including a center plate dividing the interior of a shell into a front and a rear chamber, a valve body slidably extending through the center plate, a front power piston connected to a portion of the valve body which is disposed in the front chamber, a rear power piston connected to another portion of the valve body which is disposed in the rear chamber, a front diaphragm applied to the back surface of the front power piston and dividing the interior of the front chamber into a constant and a variable pressure chamber, a rear diaphragm applied to the back surface of the rear power piston and dividing the interior of the rear chamber into a constant and a variable pressure chamber, a constant pressure passage formed in the valve body for providing a communication between the constant pressure chambers of the front and the rear chamber, and a variable pressure passage formed in the valve body for providing a communication between the variable pressure chambers of the front and the rear chamber, the rear power piston being formed with a cylindrical portion around its inner periphery which is fitted in an annular groove formed in a stepped end face of the valve body to thereby connect the rear power piston to the valve body. In accordance with the invention, the rear end of the variable pressure passage is formed inside a cylindrical portion which is formed on and projects from a stepped end face of the valve body, the cylindrical portion extending through the rear power piston while being hermetically sealed to allow the variable pressure passage to communicate with the variable pressure chamber in the rear chamber.

With the described arrangement, the rear end of the variable pressure passage and the rear power piston will overlap radially, allowing the radial dimension of the stepped end face of the valve body and hence the external diameter of the valve body to be reduced. A reduction in the external diameter of the valve body enables the effective area of the front power piston which is connected to the valve body to be increased as compared with the prior art.

Above and other objects, features and advantages of the invention will become apparent from the following description of several embodiments thereof with reference to the attached drawings.

DETAILED DESCRIPTION OF EMBODIMENTS

Figure 1:
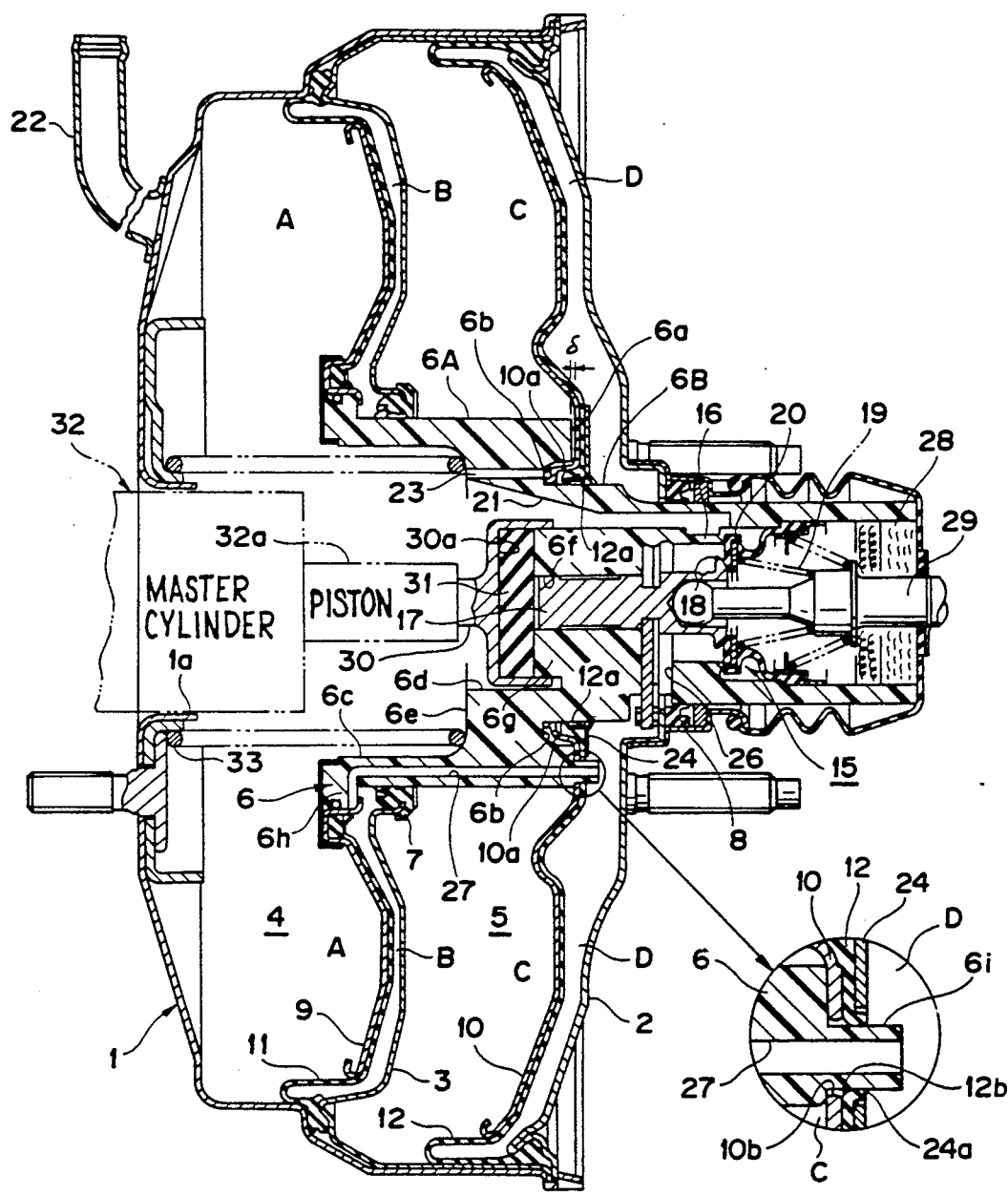
FIG. 1 is a schematic view, generally in longitudinal section, of one embodiment of the invention.

Several embodiments of the invention will be described with reference to the drawings. In FIG. 1, an enclosed vessel is defined by a front shell 1 and a rear shell 2, and the interior of the vessel is divided by a center plate 3, which is disposed centrally therein, into a front chamber 4 and a rear chamber 5 which are disposed on the opposite sides thereof. A substantially cylindrical valve body 6 slidably extends through the axial portions of the rear shell 2 and the center plate 3 while being hermetically sealed by annular seal means 7, 8, respectively.

Connected to the valve body 6 are a front power piston 9 and a rear power piston 10 which are disposed in the front chamber 4 and the rear chamber 5, respectively. A front diaphragm 11 and a rear diaphragm 12 are applied to the back surfaces of the respective power pistons 9, 10, thus defining a constant pressure chamber A and a variable pressure chamber B across the front diaphragm 11 and also defining a constant pressure chamber C and a variable pressure chamber D across the rear diaphragm 12.

A valve mechanism 15 operates to switch a fluid circuit between the pair of constant pressure chambers A, C and the pair of variable pressure chambers B, D, and is arranged within the valve body 6. Specifically, the valve mechanism 15 comprises an annular, first valve seat 16 formed on the valve body 6, an annular second valve seat 18 formed on the right end of a valve plunger 17, at a location radially inward of the first seat 16, which is slidably disposed within the valve body 6, and a valve element 20 which is urged by a spring 19 to be seated upon either valve seat 16 or 18 from the right, as viewed in FIG. 1.

A space located radially outward of an annular seat defined by the contact between the first valve seat 16 and the valve element 20 communicates with the constant pressure chamber A through an axial constant pressure passage 21 formed in the valve body 6, and the chamber A in turn communicates with an intake manifold, not shown, through a tubing 22 which is mounted on the front shell 1 for introducing a negative pressure.

The constant pressure chamber A also communicates with the constant pressure chamber C through an axially extending, second constant pressure passage 23 also formed in the valve body 6. The right end of the passage 23 communicates with the inside of an annular groove 6b formed in a stepped end face 6a between a larger diameter portion 6A and a medium diameter portion 6B of the valve body 6. An axial portion of the rear power piston 10 is formed with a stepped cylindrical portion 10a which extends forwardly. The distal end of the stepped cylindrical portion 10a which has a reduced diameter is fitted against the inner peripheral surface of the annular groove 6b and is positioned by abutment against the bottom of the annular groove 6b.

Accordingly, the constant pressure passage 23 communicates with the inside of the annular groove 6b on the outer side of the stepped cylindrical portion 10a, and is maintained in communication with the constant pressure chamber C through a clearance δ formed between the stepped end face 6a of the valve body 6 and the rear power piston 10, namely, an opening located adjacent to the rear power piston 10.

Additionally, a bead 12a extending around the inner periphery of the rear diaphragm 12 is fitted inside the stepped cylindrical portion 10a, thus preventing a communication of the constant pressure passage 23 with the variable pressure chamber D through an area around the bead 12a. A retainer 24 is fitted around the valve body 6 to prevent the bead 12a from being disengaged from the inside of the stepped cylindrical portion 10a.

On the other hand, a space located radially inward of the annular seat defined by the contact between the first valve seat 16 and the valve element 20 and radially outward of an annular seat defined by the contact between the second valve seat 18 and the valve element 20, namely, a space located between the inner and outer annular seats, communicates with the variable pressure chamber D through a radially extending, variable pressure passage 26 formed in the valve body 6, and the chamber D in turn communicates with the variable pressure chamber B through another axially extending, variable pressure passage 27 formed in the valve body 6.

Finally, a space located radially inward of the inner annular seat defined by the contact between the second valve seat 18 and the valve element 20 communicates with the atmosphere through a filter 28.

The valve plunger 17 slidably disposed within the valve body 6 has its right end connected to an input shaft 29, which is in turn mechanically coupled to a brake pedal, not shown, while its left end is disposed in opposing relationship with the right end face of a reaction disc 31 which is received in a recess 30a formed at one end of a push rod 30. The left end of the push rod 30 is mechanically coupled to a piston 32a of a master cylinder 32 which is fitted into an opening 1a, formed in the axial portion of the front shell 1, from the front side.

The valve body 6 is normally maintained in its inoperative position shown by a return spring 33 which is resiliently disposed between the front shell 1 and a stepped end face 6e formed between a larger diameter portion 6c and a medium diameter portion 6d of a stepped through-opening formed in the axial portion of the valve body 6. The valve plunger 17 is fitted in a reduced diameter portion 6f of the stepped through-opening in the valve body 6, and the recess 30a of the push rod 30 is fitted around an annular projection 6g extending from a stepped end face between the reduced diameter portion 6f and the medium diameter portion 6d.

It is to be noted that the annular groove 6b in which the stepped cylindrical portion 10a of the rear power piston 10 is fitted is located radially innermost in the stepped end face 6a, and accordingly, the inner peripheral surface of the annular groove 6b is formed in continuity from the outer peripheral surface of the medium diameter portion 6B.

As described, in the present embodiment, the annular groove 6b is located radially innermost in the stepped end face 6a, so that it will be seen that the constant pressure passage 23 defined by an axially extending opening which extends from the bottom of the annular groove 6b to the stepped end face 6e of the stepped opening is located radially more inward than a corresponding passage used in the prior art, and at the same time is located radially inward of the variable pressure passage 27 within the valve body 6.

On the other hand, the variable pressure passage 27 which provides a communication between the both variable pressure chambers B and D is defined by an axially extending opening formed in the larger diameter portion 6A which is located radially outward of the annular groove 6b. The front end of the passage 27 is folded radially outward before it opens into the rear end face of a flange 6h connected to the front power piston 9. In particular, in the present embodiment, the rear end of the passage 27 is formed by an internal space of a stepped cylindrical portion 6i which projects rearwardly from the stepped end face 6a. The distal end of the stepped cylindrical portion 6i having a reduced diameter extends through openings 10b, 12b and 24a in the rear power piston 10, the rear diaphragm 12 and the retainer 24 which are abutting against each other, with its opening located at its free end disposed within the variable pressure chamber D. Under this condition, a portion of the rear power piston 10 disposed around the through-opening 10b abuts against the stepped end face of the stepped cylindrical portion 6i. The edge defining the through-opening 12b in the rear diaphragm 12 is held tightly against the outer peripheral surface of the distal end of the stepped cylindrical portion 6i which has a reduced diameter, thus maintaining a hermetic seal in this region. This prevents a communicates between the constant pressure chamber C and the variable pressure chamber D which are located adjacent to each other with the through-opening 10b disposed therebetween.

As described, in the present embodiment, the rear end of the variable pressure passage 27 (or the internal space within the stepped cylindrical portion 6i) extends through the rear power piston 10, thus allowing them to be disposed in radially overlapping relationship. As a consequence, as compared with a conventional arrangement in which the rear end of the variable pressure passage 27 and the stepped cylindrical portion 10a of the rear power piston 10 are not disposed in radially overlapping relationship, the radial dimension of the stepped end face 6a of the valve body 6 can be reduced in this embodiment, allowing the external diameter of the larger diameter portion 6A of the valve body 6 to be reduced. A reduction in the external diameter of the larger diameter portion 6A of the valve body 6 allows the effective area of the front power piston 9 which is fitted around the flange 6h to be increased as compared with the prior art.

Figure 2:
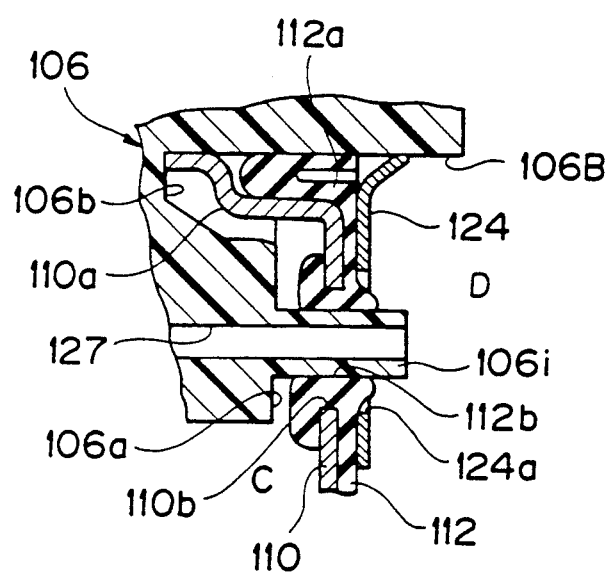
FIG. 2 is a fragmentary cross section of part of another embodiment of the invention.

FIG. 2 shows a second embodiment of the variable pressure passage 27. In the second embodiment, the rear end of the variable pressure passage 27 which has been formed by the internal space within the stepped cylindrical portion 6i extending from the stepped end face 6a is replaced by an internal space within a cylindrical portion 106i of a reduced diameter which extends from a stepped end face 106a.

In addition, a rear diaphragm 112 has a through-opening 112b formed therein, and the edge of the opening 112b is U-shaped in cross section and has an increased wall thickness. In this manner, the edge of the opening 112b defines an annular recess, in which a through-opening 110b of a rear power piston 110 is a press fit. The cylindrical portion 106i which represents the rear end of a variable pressure passage 127 extends through the through-opening 112b thus formed in the rear diaphragm 112. With this construction, the mechanical strength of the edge around the through-opening 112b in the rear diaphragm 112 can be increased while increasing the area over which the through-opening 112b is held tightly against the outer peripheral surface of the cylindrical portion 106i, thereby allowing a hermetic seal between the outer peripheral surface of the cylindrical portion 106i and the through-opening 110b in the rear power piston 110 to be reliably maintained. Parts appearing in the second embodiment are designated in principle by reference numerals denoting corresponding parts shown in the first embodiment, to which 100 is added.

It will be understood that the second embodiment operates in the same manner and functions in the same way as the first embodiment.

The both embodiments of the invention have been described as applied to a brake booster of tandem type, but it should be understood that the invention is equally applicable to a brake booster of triple type in which a pair of center plates are disposed within a shell.

While the invention has been disclosed and shown above in connection with several embodiments thereof, it should be understood that the invention is not limited to the precise embodiments shown but that a number of changes, modifications and substitutions therein will readily occur to one skilled in the art from the above disclosure without departing from the spirit and scope of the invention.

What is claimed is:

1. A brake booster including a center plate dividing the interior of a shell into a front and a rear chamber, a valve body slidably extending through the center plate, a front power piston connected to a portion of the valve body which is disposed in the front chamber, a rear power piston connected to another portion of the valve body which is disposed in the rear chamber, a front diaphragm applied to the back surface of the front power piston and dividing the interior of the front chamber into a constant and a variable pressure chamber, a rear diaphragm applied to the back surface of the rear power piston and dividing the interior of the rear chamber into a constant and a variable pressure chamber, a constant pressure passage formed in the valve body for providing a communication between the constant pressure chambers of the front and the rear chamber, and a variable pressure passage formed in the valve body for providing a communication between the variable pressure chambers of the front and the rear chamber, the rear power piston having a cylindrical portion formed around its inner periphery, which fits in an annular groove formed in a stepped end face of the valve body to connect the rear power piston to the valve body;

characterized in that the rear end of the variable pressure passage is formed in a cylindrical portion which projects from the stepped end face of the valve body, the cylindrical portion extending through the rear power piston while being hermetically sealed thereagainst to communicate the variable pressure passage to the variable pressure chamber of the rear chamber.

2. A brake booster according to claim 1 in which the cylindrical portion formed around the inner periphery of the rear power piston comprises a stepped cylindrical portion which is formed to extend forwardly with a reduced diameter at its front end, the portion of the stepped cylindrical portion having a reduced diameter being fitted around the inner peripheral surface of the annular groove formed in the valve body while distal end of the reduced diameter portion of the stepped cylindrical portion abuts against the bottom of the annular groove in the valve body, a bead extending around the inner periphery of the rear diaphragm being held between a larger diameter portion of the stepped cylindrical portion and the inner peripheral surface of the annular groove in the valve body, a retainer being fitted around the outer periphery of the valve body to prevent the stepped cylindrical portion of the rear power piston and the bead extending around the inner periphery of the rear diaphragm from being disengaged from within the annular groove in the valve body.

3. A brake booster according to claim 2 in which the cylindrical portion extending from the stepped end face of the valve body extends through-openings formed in the rear power piston, the rear diaphragm and the retainer, and edge defining the through-opening in the diaphragm being held tightly against the outer peripheral surface of the cylindrical portion of the valve body to maintain a hermetic seal thereat.

4. A brake booster according to claim 3 in which the edge defining the through-opening in the rear diaphragm is U-shaped in section and has an increased wall thickness, and is a press fit into the through-opening in the rear power piston.

5. A brake booster according to claim 1 in which a master cylinder is fitted into a front-side opening formed in the axial portion of the shell.

* * * * *

UNITED STATES PATENT AND TRADEMARK OFFICE
CERTIFICATE OF CORRECTION

PATENT NO. : 5 170 628

DATED : December 15, 1992

INVENTOR(S) : Tohru SATOH et al

It is certified that error appears in the above-identified patent and that said Letters Patent is hereby corrected as shown below:

Column 6, line 50; after "while" insert ---the---.
          line 65; after "extends" insert ---through---.
          line 67; replace "and" with ---an---.

Signed and Sealed this

Ninth Day of November, 1993

*Attest:*

BRUCE LEHMAN

*Attesting Officer*       *Commissioner of Patents and Trademarks*